April 6, 1943.　　　F. E. SMITH　　　2,316,025
NUT CRACKING MECHANISM
Filed Aug. 6, 1940　　　3 Sheets-Sheet 2
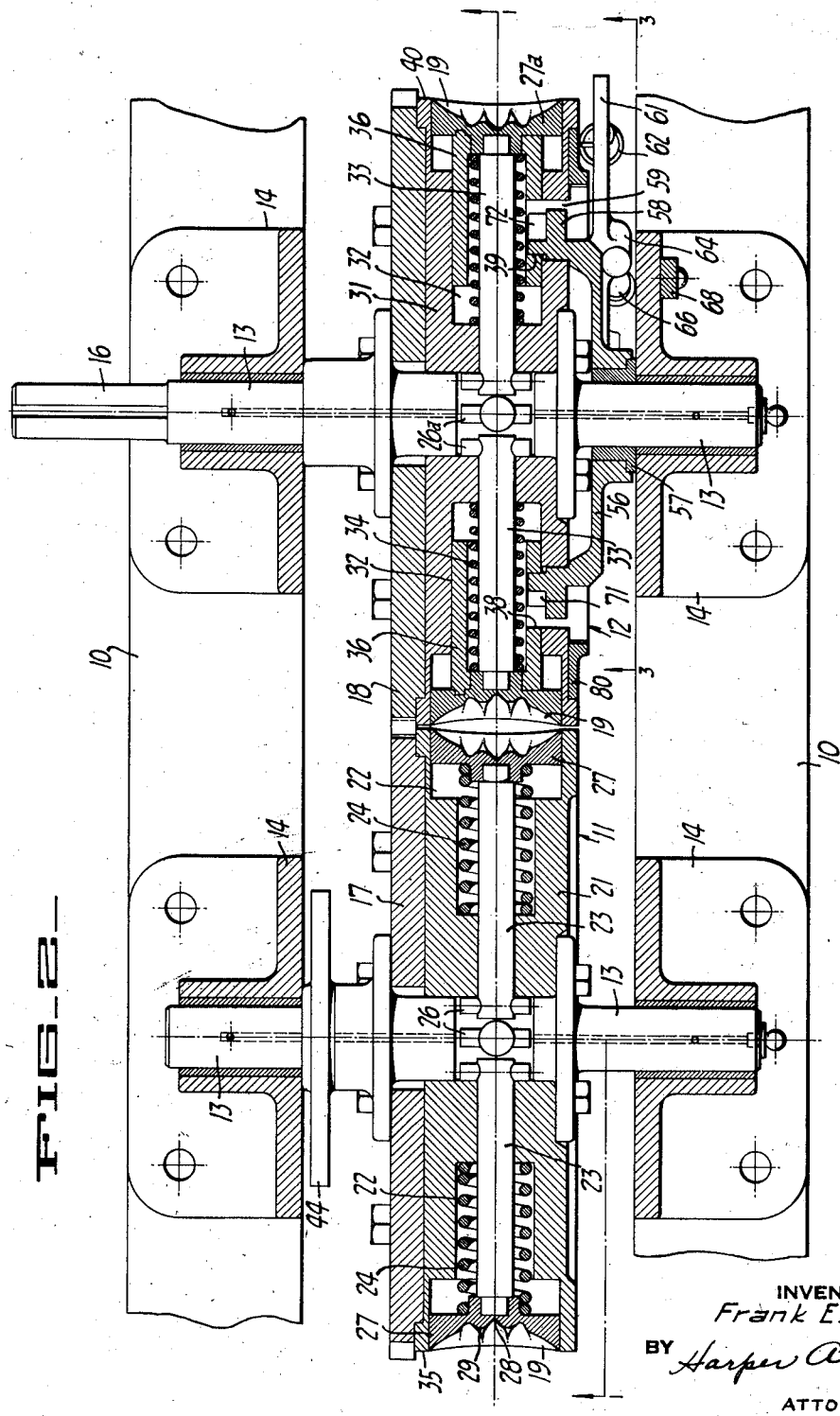
INVENTOR
Frank E. Smith
BY Harper Allen
ATTORNEY

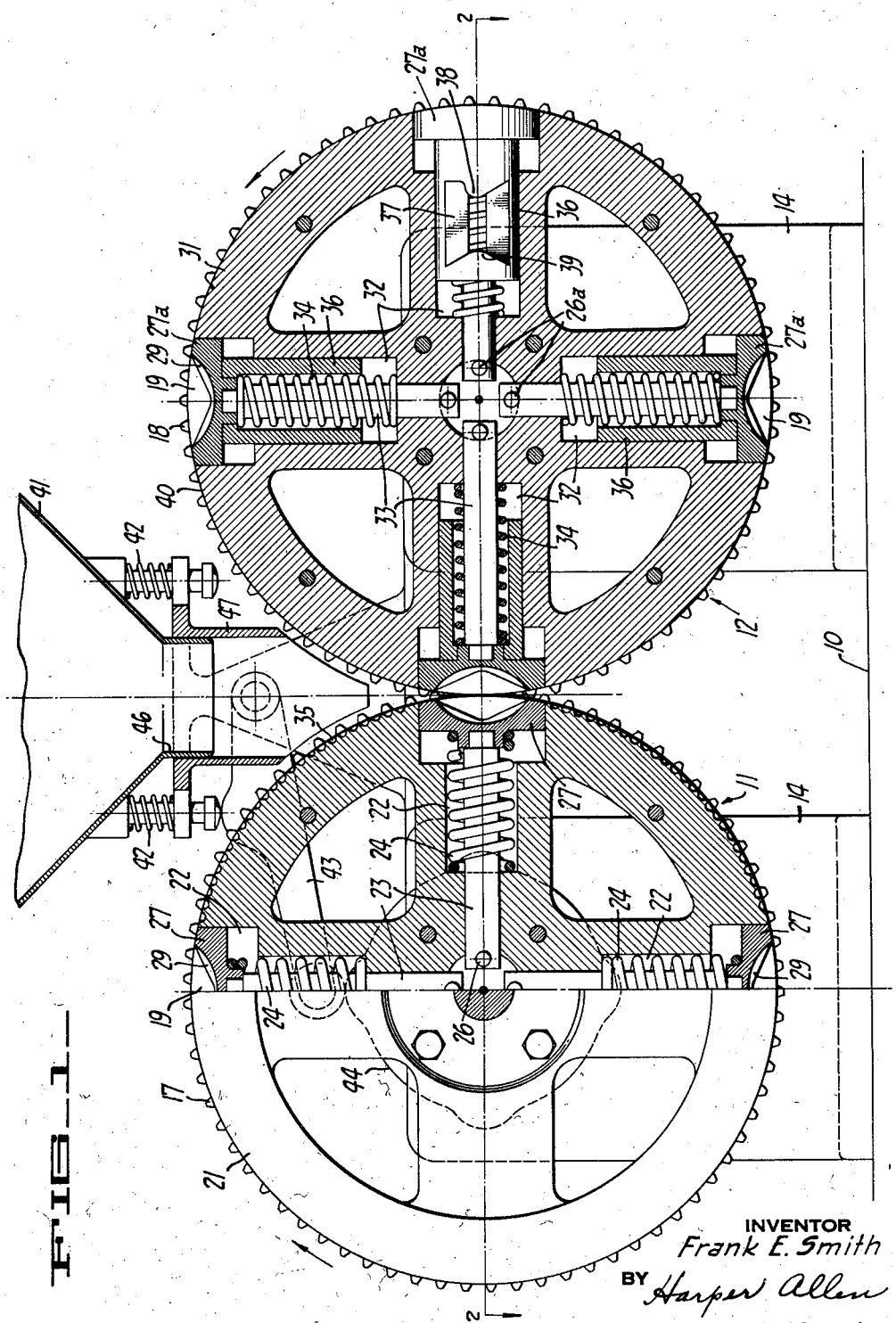

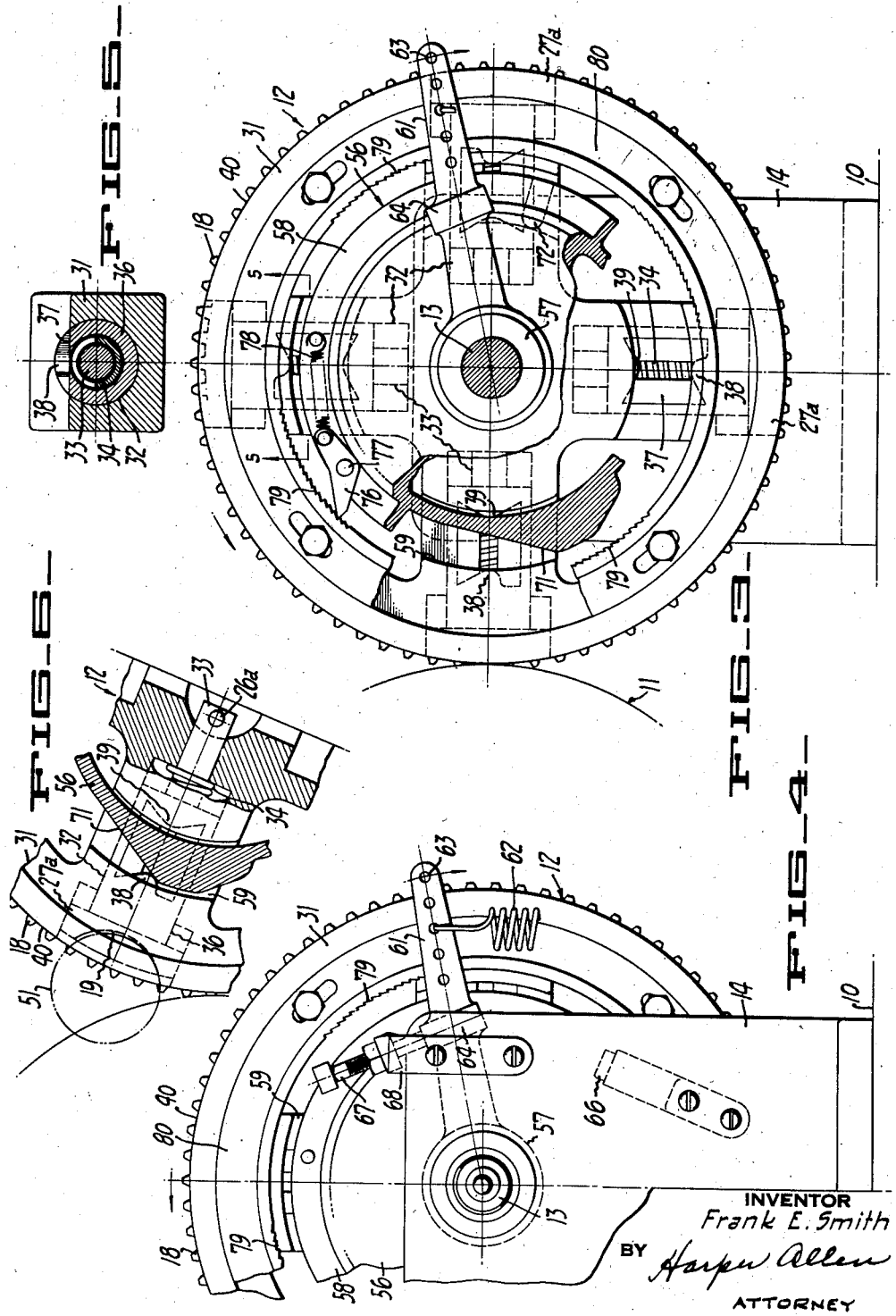

Patented Apr. 6, 1943

2,316,025

UNITED STATES PATENT OFFICE 2,316,025

NUT CRACKING MECHANISM

Frank E. Smith, San Jose, Calif.

Application August 6, 1940, Serial No. 351,609

11 Claims. (Cl. 146—11)

This invention relates to nut cracking apparatus and is concerned more particularly with the provision of an improved form of continuously operated nut cracker for nuts such as English walnuts.

It is an object of the invention to provide an improved form of continuously operated nut cracking mechanism.

Another object of the invention is to provide a nut cracking mechanism which provides a predetermined amount of cracking movement for application to the nut and which accommodates itself readily to different sizes of nuts.

Another object of the invention is to provide an improved nut cracking apparatus which may be employed with or without sizing operation on the nuts.

Another object of the invention is to provide an improved nut cracking apparatus which affords means for locking in the machine the desired amount of crack to be applied to the nut under control of the nut itself, whereby substantially the same amount of crack will be applied to different sizes of nuts.

Other objects and advantages of the invention will be apparent from the following description of a preferred embodiment thereof as illustrated in the accompanying drawings, in which:

Figure 1 is a sectional elevational view of a nut cracker embodying my invention;

Figure 2 is a horizontal sectional view of the nut cracking apparatus taken in a plane indicated by the line 2—2 in Figure 1;

Figure 3 is a fragmentary sectional elevation of a portion of the cracking apparatus;

Figure 4 is an elevational view of one end of the nut cracker;

Figure 5 is a sectional view of a portion of the nut gauging and cracking plunger as indicated by the line 5—5 in Figure 3;

Figure 6 is a fragmentary sectional view illustrating another phase of the operation of the machine with one of the cracking plungers in nut gauging position.

Generally, the nut cracker of my invention includes a series of successively operating pockets which serve to position and hold the nut and to effect the cracking operation. Associated with the pockets is a locking mechanism which operates after the sizing operation on the nut to lock the active pocket in its adjusted position so that the cracking movement is applied to the nut after the pocket has accommodated itself to the size of the nut. Also associated with the series of pockets is a feed mechanism for maintaining a free flow of nuts to the cracking pockets.

Referring to Figures 1 and 2, the machine includes a base 10 upon which two cracking disc assemblies 11 and 12 are provided. Each of the disc assemblies is journaled about a horizontal axis by means of a pair of stub shafts 13 supported in respective bearing brackets 14 mounted on the base 10. As seen in Figure 2, one of stub shafts 13 is extended as at 16 to provide a driving connection to a suitable source of power such as an electric motor.

The two disc assemblies 11 and 12 have respective gears 17 and 18 (Figures 1 and 2) which mesh together so that the two disc assemblies rotate simultaneously and in the direction indicated by the arrows in Figure 1, with their adjacent surfaces moving downwardly. The disc assemblies 11 and 12 have respective series of complemental recesses formed therein to provide a series of cracking pockets 19 which operate and are constructed in a manner later described.

The disc assembly 11 includes a disc 21 to which gear 17 is secured by suitable cap screws and to which the flanged hubs of shafts 13 are suitably secured. The disc 21 is provided with four equally spaced apart radial apertures 22 to receive pocket plungers 23 which are urged outwardly by stiff compression springs 24 and have their outward movement limited by respective pins 26. If desired, the springs 24 may be omitted and the plungers 23 mounted solidly in the disc. Each plunger 23 is provided with an enlarged cylindrical head 27 which is removably mounted on the plunger by a threaded engagement and is provided with respective corrugations or ribs 28 and 29. At the points of contact with the nuts the ribs are sharpened to provide spaced knife-edge points of contact for a nut in the pocket. As seen in Figures 1 and 2, the pocket 19 is elongated parallel to the axes of the discs so that the elongated corrugations 28 in this direction tend to aid in positioning the nut, as will be described later.

The disc assembly 12 includes a disc 31 having four equally spaced radial apertures 32 in which the cracking plungers 33 are mounted, being urged radially outwardly by compression spring 34 which is lighter than the spring 24 and being held in a limiting radially outward position by pins 26a. The plungers 33 are provided with a removable head 27a similar in all respects to the head 27. In addition, each plunger 33 is provided with a sleeve 36 which is suitably secured thereto. Each sleeve 36 is cut away on one side at 37 to provide a cam face 38 and a V-shaped latch nose 39, as seen most clearly in Figure 1. The strength of the spring 34 associated with each cracking plunger 33 is such that it will yield when a nut is engaged with the pocket 19 from the feed mechanism.

As will be apparent from inspection of Figure 1, during rotation of the disc assemblies 11 and 12, the successive plunger heads 27 and 27a form an endless series of pockets as they converge to receive nuts which are fed downwardly between the adjacent surfaces 35 and 40 of the disc assemblies.

In order to effect the constant feed of nuts in properly aligned position to the pockets 19, a feed hopper 41 is provided which is mounted for vertical vibrating movement by spring assemblies 42 and is constantly vibrated as by means of a cam follower arm 43 engaging a cam 44 on one of the shafts 13. The hopper 41 converges at its lower portion to a substantially circular spout 46 which telescopes within a stationary feed tube 47 which is cut away at its lower portion to conform to the outline of the disc assemblies 11 and 12 and is in centered position transversely with respect thereto to feed nuts directly to the successive pockets 19. By virtue of the constant vibration of the hopper 41, the nuts are maintained loose and in proper position for feeding downwardly onto the surfaces 35 and 40 which may be corrugated, as for example, as shown on surface 35 parallel to the axis to effect the rolling action of the nut as it lies between the two surfaces so that its longitudinal axis will be aligned with the axes of the discs and with the axis of the pocket 19 to which it is fed.

As a nut, as for example shown at 51 in Figure 6, enters one of the pockets 19, the associated plunger 33 will be forced inwardly against its spring 34 for an amount determined by the size of the nut, until such inward movement is stopped by a lock which becomes effective to prevent further inward movement. The lock operation is timed for engagement at the proper moment so that as the nut 51 continues to travel downwardly in the pocket 19 it will be compressed between the plunger heads 27 and 27a to effect the cracking operation.

The lock mechanism operates intermittently in time with the operation of the pockets and a single lock cooperates successively with each pocket of the series as the operation proceeds. As seen in Figures 2, 3, and 4, a locking disc 56 is journaled about sleeve 57 on one of shafts 13 adjacent the disc assembly 12 and is provided with an annular flange 58 which projects into an annular recess 59 in the side face of the disc 31. The flange 58 also projects into the cut-away portion 37 of the plungers 33 to lie between the cam surfaces 38 and the V-shaped latch nose 39 thereof for purposes which will be later apparent.

Disc 56 (Figures 4 and 5) is provided with an arm 61 to which tension spring 62 is attached in one of apertures 63 so that the disc 56 is constantly urged in a clockwise direction by spring 62, as indicated by the arrow adjacent arm 61. Arm 61 is provided with an integral stop portion 64 which, in a clockwise direction of movement, may engage a rubber bumper 66 if no nut is fed to the machine, and in the other or counter clockwise direction of movement will engage an adjustable stop screw 67 carried by a bracket 68 on one of standards 14.

The locking disc 56 (Figure 3) is provided on one portion of the flange 58 with a cam surface 71 for cooperation with the cam surface 38 of the plunger 33 which is engaged with a nut to limit the inward movement of the plunger 33 as the nut is moved downwardly with the cooperating pocket 19. In its counter-clockwise direction of movement, the disc 56 is carried along with the disc assembly 12 by means of a stop 72 secured on disc 56 and which is engaged by the spring-urged latch nose 39 on the plunger in a manner later described. The disc 56 is also provided with a locking pawl 76 pivoted at 77 thereon and urged by a spring 78 to place its nose into engagement with one of a series of four racks 79 formed on a ring 80 adjustably secured to disc 31. Racks 79 are equally spaced apart in proper relation to the location of the plungers 33.

It is believed that the function and operation of the locking disc 56 can best be understood in connection with a description of the operation of the machine. Assuming the hopper 41 to be full of nuts and the disc assemblies 11 and 12 being driven the lowermost nut in the tube 47 is rotated on the discs 35 and 40 by means of the corrugations on the disc 35 to align its longitudinal axis parallel to the axis of the pocket and drops into the next operative pocket 19.

As the disc assemblies 11 and 12 continue to rotate, the nut forces the plunger 33 inwardly against the pressure of its spring 34. During this same time, the locking disc 56 under the urgency of its spring, has engaged its fixed stop 72 with the latch nose 39 of the second plunger 33 ahead of the active plunger, so that the disc 56 is being carried with the disc 12 until the arm 61 engages the adjustable stop screw 67, at which time the plunger 33 will be forced inwardly against its spring 34 until its latch nose 39 passes stop 72 to release the disc 56 for movement in a clockwise direction.

The movement of disc 56 in a clockwise direction is stopped when its cam surface 71 wedges beneath the cam surface 38 of the active plunger 33, thus stopping the inward movement of the plungers. At the time that the disc 56 is stopped by the engagement of the cam surfaces 38 and 71, the pawl 76 engages one of the ratchet teeth 79 to lock the disc 56 with reference to the disc assembly 12 for the remainder of the cracking movement. This operation will occur a few degrees ahead of the axially aligned position of the active plungers as shown in Figures 1 and 2, that is, approximately in the position shown in Figure 6, this position being determined by the adjustment of the stop screw 67 and the strength of the spring 62.

Thus, the timing of the engagement of the cam surfaces 71 and 38 determine the number of degrees ahead of the axially aligned position in which the inward movement of the plunger 33 is stopped and therefore the amount of convergence of the plungers 33 and 23 during the continued rotation to the axially aligned position thereof, which is the extent of cracking movement applied to the nut. As the disc assemblies continue to rotate, the cracked nut is released from the pocket 19 and the plunger 33 is free to move outwardly under the influence of its spring 34 to release the engagement of the cam surfaces 38 and 71 and thereby enable the cam disc 56 to move around until its stop 72 engages the latch nose 39 of the next plunger 33. This operation continues in sequence as the successive pockets pick up nuts from the hopper 41.

The corrugations or protuberances 29 in the nut cracking pockets not only assist in the cracking operation by engaging the nut at spaced points, but by virtue of their substantially V-shaped relation aid in centering the nut. Better shattering is also obtained because of the spaced points at which pressure is applied as well as the provision of recessed portions around the protuberances to allow slight outward movement of the crack portions of the nut shell, thereby minimizing injury to the nut meat.

I claim:

1. In a nut cracker, a pair of aligned discs having parallel axes, means gearing said discs together for timed movement, a series of equally spaced pocket forming members in each of said discs, whereby said pocket forming members cooperate to provide a pocket between the adjacent discs to receive and crack a nut, one of said pocket forming members comprising a yieldable plunger having a recess in the side thereof bounded by a cam face on one edge of the recess and a latching nose on the other edge of the recess, a locking disc having a flange extending into said recesses of said one series of plungers, said locking disc having a cam surface for successive engagement with the cam surfaces of said pocket members, and a fixed stop for engagement with the latching noses of said pocket members, a spring urging said cam disc in one direction relative to said pockets and an adjustable stop for engagement by said locking disc when being rotated by one of said pocket members.

2. In a nut cracker, a pair of aligned discs mounted with their axes parallel and geared together for simultaneous rotation, a series of recesses formed in the periphery of each of said discs, said recesses cooperating to form nut-holding pockets during rotation of said discs, one series of said recess forming means comprising yieldable plungers disposed radially of the associated disc, and a locking element mounted for oscillation to engage said plungers successively to lock the active plunger ahead of the position wherein its axis lies in the plane containing said disc axes whereby a cracking force will be applied to a nut engaged with said plunger.

3. In a nut cracker, a pair of aligned discs mounted with their axes parallel and geared together for simultaneous rotation, a series of recesses formed in the periphery of each of said discs, said recesses cooperating to form nut-holding pockets during rotation of said discs, one series of said recess forming means comprising yieldable plungers disposed radially of the associated disc, and locking means associated with said plungers for locking the active plunger ahead of the position wherein its axis lies in the plane containing said disc axes whereby a cracking force will be applied to a nut engaged with said plunger, the periphery of one of said discs being corrugated to effect rotation of a nut engaged therewith before seating thereof in a recess.

4. In a nut-cracking machine of the character described, a pair of laterally spaced rotatable members of generally disc-like shape, means supporting said members in side by side relation, hubs for said discs, and means for simultaneously rotating said hubs, one of said disc-like members being provided with a circumferential series of spaced nut-accommodating recesses, and the other of said disc-like members having mounted thereon circumferentially thereof a plurality of radially shiftable cups corresponding in number with said nut-receiving recesses and coactingly opposed therewith for receiving and crushing nuts fed thereto, spring devices yieldably urging said cups radially outwardly with respect to the associated hubs, and means for yieldably locking said cups in fixed radial position, successively, said locking means including means located adjacent the bight between the hubs and extending from a point immediately in front of the bight, past the same to a point in the rear of the bight.

5. In a nut cracker, a pair of aligned discs having parallel axes, means securing said discs together for timed movement, a series of equally spaced pocket forming means in each of said discs, whereby an opposed pair of said respective series of pocket forming means cooperate to provide a pocket between the adjacent discs to receive and crack a nut, one of said pocket forming means comprising a yieldable plunger having a recess in the side thereof provided with a cam face, a locking disc having a portion extending into said recesses of said series of plungers, said locking disc having a cam surface for successive engagement with the cam surfaces of said pocket members, spring means urging said cam disc in a direction opposite to the direction of rotation of said pocket members, and means for overcoming said spring means whereby said locking disc is successively carried along with each of said plungers during a portion of its travel to lock the plunger against yielding movement during cracking of a nut.

6. In a nut cracker, a pair of aligned discs having parallel axes, means securing said discs for simultaneous rotation, a series of equally spaced pocket forming means in each of said discs, whereby an opposed pair of said respective series of pocket forming means cooperate to provide a pocket between the adjacent discs to receive and crack a nut, one of said pocket means comprising a yieldable plunger, a locking disc mounted for oscillation about the axis of the said discs carrying said plungers, and means for controlling movement of said locking disc to cause it to travel successively with each of said plungers as a plunger approaches and passes through its cracking position to lock said plunger against yielding during cracking of a nut.

7. In a nut cracker, a pair of aligned discs having parallel axes, means securing said discs for simultaneous rotation, a series of equally spaced pocket forming means in each of said discs, whereby an opposed pair of said respective series of pocket forming means cooperate to provide a pocket between the adjacent discs to receive and crack a nut, one of said pocket means comprising a yieldable plunger, a locking disc mounted for oscillation about the axis of the said discs carrying said plungers, said last-named means including an adjustable stop for engagement by said locking disc to control its disengagement from an associated plunger and spring means for returning said disc after engagement with one of said plungers to cause engagement thereof with another said plunger.

8. In a nut cracker, a pair of aligned discs having parallel axes, means securing said discs for simultaneous rotation, means in each of said discs for forming a series of pockets between said discs as they approach each other to receive and crack nuts, said pocket forming means in one of said discs comprising a series of yieldable plungers, each plunger having a recess in the side thereof bounded by a cam face on one edge of the recess and a latching nose on the other edge of the recess, a locking disc having a flange extending into said recesses of said series of plungers, said locking disc having a cam surface for successive engagement with the cam surfaces of said plungers and a fixed stop for successive engagement with the latching noses of said pocket members, a spring urging said cam disc in one direction relative to said pockets, an adjustable stop for engagement by said locking disc when being rotated by one of said pocket members, a series of teeth on said one disc, and a locking pawl carried by said disc for preventing rebounding movement of said locking disc relative to a plunger after engagement of said cam surfaces.

9. In a nutcracker, a pair of aligned discs mounted with their axes parallel and geared together for simultaneous rotation, a series of recesses formed in the periphery of each of said discs, said recesses cooperating to form nut holding pockets during rotation of said discs, said series of recess forming means in one of said discs comprising yieldable plungers disposed radially of said one disc, a locking element mounted for oscillation about the axis of said one disc to engage said plungers successively to lock the active plunger ahead of the position wherein its axis lies in a plane containing said disc axes, and cooperating latching means cooperating with said one disc and said locking element to latch said locking element with respect to the associated plunger during movement of the plunger in cracking a nut.

10. In a nut cracker, a pair of aligned discs, mounted with their axes parallel and geared together for simultaneous rotation, a series of recesses formed in the periphery of each of said discs, said recesses cooperating to form nut holding pockets during rotation of said discs, said recess forming means in one of said discs comprising a series of yieldable plungers disposed radially of the associated disc and each having a cam surface in the direction of rotation of said one disc, a locking element mounted for oscillation about the axis of said one disc and spring-urged in a direction to engage said cam surface to lock the active plunger ahead of its nut-cracking position, cooperating means on said element and each plunger whereby said element is successively picked up and rotated with a plunger, and means for disabling said cooperating means whereby said element cooperates successively with each of said plungers.

11. In a nut cracker, a pair of aligned discs, mounted with their axes parallel and geared together for simultaneous rotation, a series of recesses formed in the periphery of each of said discs, said recesses cooperating to form nut holding pockets during rotation of said discs, said recess forming means in one of said discs comprising a series of yieldable plungers disposed radially of the associated disc and each having a cam surface facing in the direction of rotation of said one disc, a locking element mounted for oscillation about the axis of said one disc and spring-urged in a direction to engage said cam surface to lock the active plunger ahead of its nut-cracking position, cooperating means on said element and each plunger whereby said element is successively picked up and rotated with a plunger, and automatically operable latching means active to prevent rebounding movement of said locking element after engagement with a plunger until said one disc moves ahead of said locking element during its rotation.

FRANK E. SMITH.